(12) United States Patent
Levin et al.

(10) Patent No.: US 11,175,945 B2
(45) Date of Patent: *Nov. 16, 2021

(54) SYSTEM AND METHOD FOR DISTRIBUTED SECURITY FORENSICS USING PROCESS PATH ENCODING

(71) Applicant: Twistlock, Ltd., Herzliya (IL)

(72) Inventors: Liron Levin, Herzliya (IL); Dima Stopel, Herzliya (IL); Ami Bizamcher, Kiryat Ono (IL); Michael Kletselman, Tel Aviv (IL); John Morello, Baton Rouge, LA (US)

(73) Assignee: Twistlock, Ltd., Herzliya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/897,951

(22) Filed: Jun. 10, 2020

(65) Prior Publication Data

US 2020/0301728 A1    Sep. 24, 2020

Related U.S. Application Data

(63) Continuation of application No. 16/144,320, filed on Sep. 27, 2018, now Pat. No. 10,740,135.

(Continued)

(51) Int. Cl.
| | |
|---|---|
| *G06F 9/455* | (2018.01) |
| *H04L 29/06* | (2006.01) |
| *G06F 16/23* | (2019.01) |
| *G06N 20/00* | (2019.01) |
| *G06F 21/53* | (2013.01) |

(Continued)

(52) U.S. Cl.
CPC ...... *G06F 9/45558* (2013.01); *G06F 9/44505* (2013.01); *G06F 16/2379* (2019.01); *G06F 21/51* (2013.01); *G06F 21/53* (2013.01); *G06F 21/54* (2013.01); *G06K 9/6256* (2013.01); *G06N 20/00* (2019.01); *H04L 63/20* (2013.01); *G06F 2009/45583* (2013.01);

(Continued)

(58) Field of Classification Search
CPC ............ G06F 9/45558; G06F 16/2379; G06F 9/44505; G06F 21/51; G06F 21/53; G06F 21/54; G06F 2009/45583; G06F 2009/45587; G06F 2009/45591; G06F 2009/45595; G06N 20/00; G06K 9/6256; H04L 63/20

See application file for complete search history.

(56) References Cited

U.S. PATENT DOCUMENTS

| | | |
|---|---|---|
| 8,589,403 B2 | 11/2013 | Marquardt et al. |
| 8,769,684 B2 | 7/2014 | Stolfo et al. |

(Continued)

*Primary Examiner* — Gregory A Kessler
(74) *Attorney, Agent, or Firm* — M&B IP Analysts, LLC

(57) ABSTRACT

A host device and methods for efficient distributed security forensics. The method includes creating, at a first host device configured to run a first virtualization entity, a first event index for the first virtualization entity; encoding at least one event related to the first virtualization entity, wherein each event includes a process having a process path, wherein encoding the at least one event includes replacing at least a portion of each event with at least one code representing at least the process path of the respective process; updating the first event index based on the encoded at least one event; and sending the first event index to a master console, wherein the master console is configured to receive a plurality of event indices created by a plurality of host devices with respect to a plurality of virtualization entities.

20 Claims, 4 Drawing Sheets

Related U.S. Application Data

(60) Provisional application No. 62/700,586, filed on Jul. 19, 2018.

(51) Int. Cl.
*G06K 9/62* (2006.01)
*G06F 9/445* (2018.01)
*G06F 21/51* (2013.01)
*G06F 21/54* (2013.01)

(52) U.S. Cl.
CPC .............. *G06F 2009/45587* (2013.01); *G06F 2009/45591* (2013.01); *G06F 2009/45595* (2013.01)

(56) References Cited

U.S. PATENT DOCUMENTS

| | | |
|---|---|---|
| 9,794,275 B1 | 10/2017 | Benameur et al. |
| 10,042,697 B2 | 8/2018 | Ahad |
| 10,110,600 B1 | 10/2018 | Simca |
| 10,270,788 B2 | 4/2019 | Faigon et al. |
| 10,397,255 B1 | 8/2019 | Bhalotra et al. |
| 10,474,934 B1 | 11/2019 | Cosic |
| 10,572,375 B1 | 2/2020 | Wagner |
| 10,621,019 B1 | 4/2020 | Faulhaber, Jr. et al. |
| 10,713,543 B1 | 7/2020 | Skuin et al. |
| 10,951,648 B2 | 3/2021 | Doron et al. |
| 10,997,009 B2 | 5/2021 | Poghosyan et al. |
| 2016/0099963 A1 | 4/2016 | Mahaffey et al. |
| 2016/0350173 A1 | 12/2016 | Ahad |
| 2016/0359695 A1 | 12/2016 | Yadav et al. |
| 2017/0214702 A1 | 7/2017 | Moscovici et al. |
| 2017/0220651 A1 | 8/2017 | Mathew et al. |
| 2017/0353477 A1 | 12/2017 | Faigon et al. |
| 2018/0060581 A1 | 3/2018 | El-Moussa et al. |
| 2018/0060582 A1 | 3/2018 | El-Moussa et al. |
| 2018/0060744 A1 | 3/2018 | Achin et al. |
| 2018/0083833 A1 | 3/2018 | Zoll et al. |
| 2018/0091531 A1 | 3/2018 | El-Moussa et al. |
| 2018/0196732 A1 | 7/2018 | Dolev et al. |
| 2018/0285563 A1 | 10/2018 | Browne et al. |
| 2018/0288091 A1 | 10/2018 | Doron et al. |
| 2018/0309770 A1 | 10/2018 | Han et al. |
| 2018/0351838 A1 | 12/2018 | Lui |
| 2019/0044963 A1 | 2/2019 | Rajasekharan et al. |
| 2019/0068627 A1 | 2/2019 | Thampy |
| 2019/0121979 A1 | 4/2019 | Chari et al. |
| 2019/0179678 A1 | 6/2019 | Banerjee et al. |
| 2019/0286826 A1 | 9/2019 | Bargury et al. |
| 2019/0294477 A1 | 9/2019 | Koppes et al. |
| 2019/0294960 A1 | 9/2019 | Niemi |
| 2019/0377625 A1 | 12/2019 | Chintalapati et al. |
| 2020/0183769 A1 | 6/2020 | Poghosyan et al. |

US 11,175,945 B2

SYSTEM AND METHOD FOR DISTRIBUTED SECURITY FORENSICS USING PROCESS PATH ENCODING

CROSS-REFERENCE TO RELATED APPLICATIONS

This application is a continuation of U.S. patent application Ser. No. 16/144,320 filed on Sep. 27, 2018, now allowed, which claims the benefit of U.S. Provisional Application No. 62/700,586 filed on Jul. 19, 2018. The contents of the above-referenced Applications are hereby incorporated by reference.

TECHNICAL FIELD

The present disclosure relates generally to cloud native technologies, and more specifically to cloud native virtual machines.

BACKGROUND

In modern cloud native environments, virtual machines are typically deployed through automation and are operated as stateless entities. The Cloud Native Computing Foundation defines cloud native technologies as involving building and running scalable applications in modern, dynamic environments such as public, private, and hybrid clouds. Example cloud native technologies include containers, service meshes, microservices, immutable infrastructure, and declarative application programming interface (API).

Cloud native virtual machines (VMs) are designed to run containers directly or to run stateless workloads in support of containerized applications, are dynamically deployed and orchestrated with minimal human involvement, and are focused on hosting and running microservices. Such cloud native VMs may be targets for attackers seeking to disrupt businesses or steal data.

Existing solutions for protecting containers or light VM applications typically use events generated by the containers or applications to analyze potential security threats. Such events may be processed by a security information and events management (SIEM) system or distributed logging framework.

SIEM systems collect and store log data collected from various devices and hosts. Forensic analysis of this log data allows for identifying security breaches and what systems were compromised by the breaches. Centrally accessible log data therefore allows for forensically analyzing an infrastructure as a whole rather than as a set of individual systems.

Existing solutions for providing runtime security defense typically generate a high number of events to be processed by the SIEM system, distributed logging framework, and the like. To this end, such solutions may send aggregated events combined and saved in a profile. However, even when aggregated, the high number of events is not practical to send over a network to the SIEM system or distributed logging framework because of the amount of network bandwidth, storage, and CPU. In particular, problems with network bandwidth may be excessive when containers or applications are implemented in cloud environments.

Additionally, for existing solutions to understand how an event correlates with other events, all entity index data must be stored. As a result, existing solutions demand a large amount of memory dedicated to events data. With existing solutions, this memory use cannot be reduced without removing the context of these correlations.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for method for efficient distributed security forensics. The method comprises: creating, at a first host device configured to run a first virtualization entity, a first event index for the first virtualization entity; encoding at least one event related to the first virtualization entity, wherein each event includes a process having a process path, wherein encoding the at least one event includes replacing at least a portion of each event with at least one code representing at least the process path of the respective process; updating the first event index based on the encoded at least one event; and sending the first event index to a master console, wherein the master console is configured to receive a plurality of event indices created by a plurality of host devices with respect to a plurality of virtualization entities.

Certain embodiments disclosed herein also include a non-transitory computer readable medium having stored thereon causing a processing circuitry to execute a process, the process comprising: creating, at a first host device configured to run a first virtualization entity, a first event index for the first virtualization entity; encoding at least one event related to the first virtualization entity, wherein each event includes a process having a process path, wherein encoding the at least one event includes replacing at least a portion of each event with at least one code representing at least the process path of the respective process; updating the first event index based on the encoded at least one event; and sending the first event index to a master console, wherein the master console is configured to receive a plurality of event indices created by a plurality of host devices with respect to a plurality of virtualization entities.

Certain embodiments disclosed herein also include a system for efficient distributed security forensics. The system comprises: a processing circuitry; and a memory, the memory containing instructions that, when executed by the processing circuitry, configure the system to: create, at a first host device configured to run a first virtualization entity, a first event index for the first virtualization entity; encode at least one event related to the first virtualization entity, wherein each event includes a process having a process path, wherein encoding the at least one event includes replacing at least a portion of each event with at least one code representing at least the process path of the respective process; update the first event index based on the encoded at least one event; and send the first event index to a master console, wherein the master console is configured to receive a plurality of event indices created by a plurality of host devices with respect to a plurality of virtualization entities.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
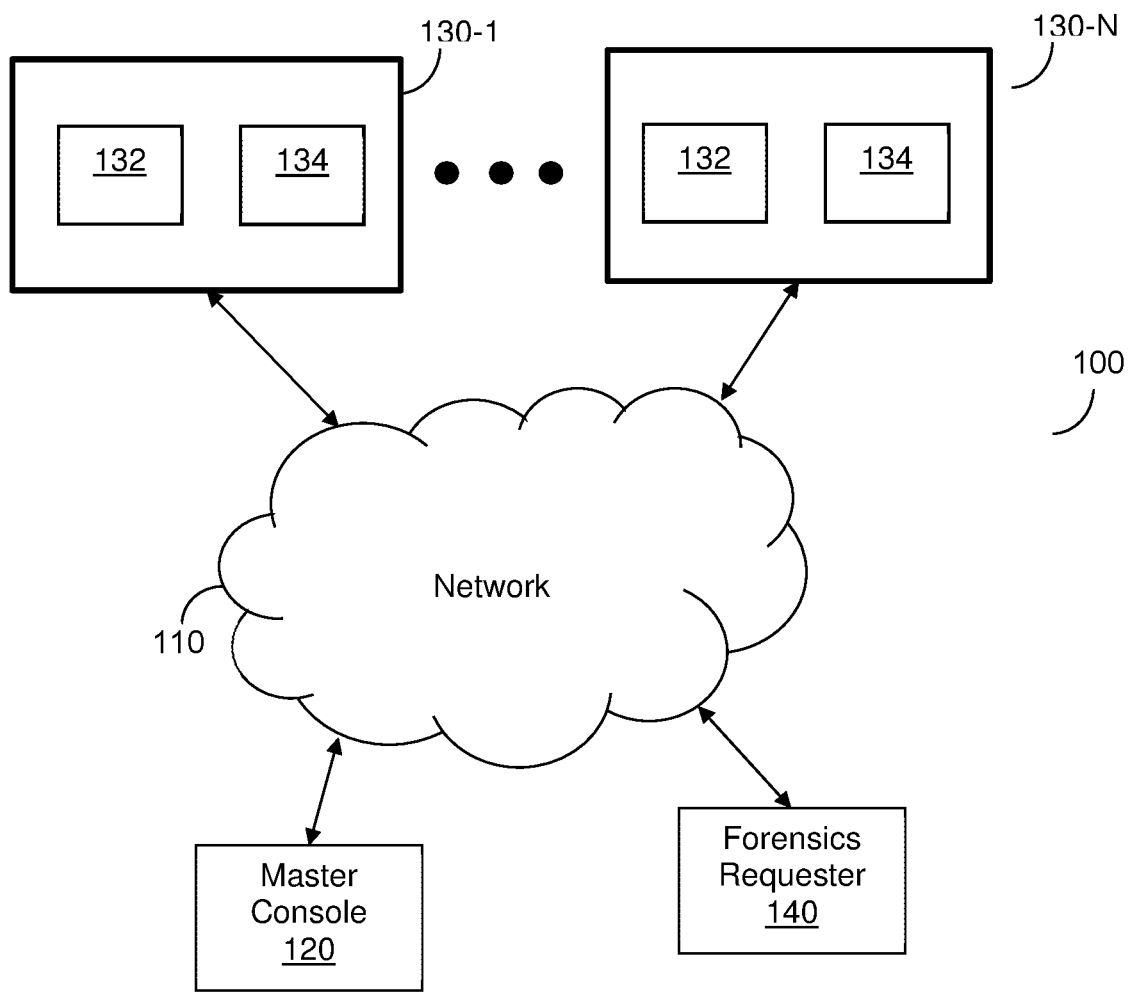
FIG. 1 is a network diagram utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a system and method for distributed security forensics for virtualization entities such as containers and light VMs. Specifically, the disclosed embodiments provide entity profiles including event indices for one or more virtualization entities using event data that is collected and recorded at a host of each monitored entity. The full set of entity profile data is distributed among the hosts and may be stored in the master console, for example, upon request. Each entity may be a container, a set of containers hosted on the same host, or a VM (e.g., a light VM).

In an embodiment, an append-only event index is created in an agent for each monitored entity. When a new event is received, the agent is configured to compress and encode the event based on an entity profile. As an example, if the same process appears multiple times, the encoding may include a compact encoding that represents the process path, time, and other details. To fetch the data, the local index or related indices is uploaded to a master console and unpacked according to the coding process.

The disclosed embodiments further allow for saving events data securely and compactly. Events are recorded locally at the respective host devices. Data is indexed outside of a master console and encoded in a distributed manner (i.e., at the host devices) before being uploaded to the master console. In some implementations, all events may be recorded. In other implementations, only certain events may be recorded, thereby further reducing the amount of data needing to be transmitted to and stored by the master console.

Additionally, in an embodiment, only writes of the events data to disk may be optimized and read time may not be optimized. Specifically, writing may be optimized with respect to, for example, disk size, write throughput, and RAM usage. Thus, read time may be permitted to be slow as compared to existing storage solutions in which both writes and reads are optimized. This further reduces the computing resources required to transmit and access the events data.

FIG. 1 is an example network diagram 100 utilized to describe various disclosed embodiments. The example network diagram 100 illustrates a master console 120, host devices 130-1 through 130-N (hereinafter referred to individually as a host device 130 or collectively as host devices 130 for simplicity), and a forensics requester 140 communicatively connected to a network 110. The network 110 may be the Internet, the world-wide-web (WWW), a local area network (LAN), a wide area network (WAN), a metro area network (MAN), and other networks.

Each host device 130 can be realized as a physical machine, a virtual machine, or a cloud infrastructure (IaaS). Examples for such a cloud infrastructure include, but are not limited to, Amazon Web Services (AWS), Cisco® Metapod, Microsoft Azure®, Google® Compute Engine (GCE), Joyent®, and the like. The host device 130 may be deployed in a datacenter, a cloud computing platform (e.g., a public cloud, a private cloud, or a hybrid cloud), on-premises of an organization, or in a combination thereof.

According to the disclosed embodiments, each host device 130 is configured to host and execute an entity 132. Each entity 132 may be a software container, a group of software containers, a VM, a host operating system (OS) service, a user, a file, or a network interface. Execution of each entity 132 is monitored by an agent 134 installed on the respective host entity 130 and configured as described herein.

The master console 120 is configured to receive encoded events data uploaded by the agents 134 over the network 110 and to unpack the received events data based on the coding scheme used to encode the events data. The agents 134 may be, but are not limited to, applications of light virtual machines (VMs), software containers of respective host devices among the host entities 130, or a combination thereof. Each agent 134 is configured to monitor events and perform security forensics as described herein. Thus, the master console 120 may provide access to events data recorded among any of the host devices 130. The master console 120 may further store entity profiles of each of the entities 132. The entity profiles may be utilized to unpack encoded events data by defining codes for event details, thereby allowing for decoding based on the definitions of the codes.

The entity profiles hold all information about an entity in a cluster. Each entity profile is a "key:values" data structure, where the key is the type of the event and the values are a list of unique events for that type. As a non-limiting example, an entity profile for an image in a containerized environment may be:

Running for 10 [m]
Has 5 associated containers
Startup process: /bin/bash, parent: /bin/runc md5: <x>
Long running processes: /foo1 runs for 5 minutes
User: user
File access:—process foo1 write to /tmp read from /var/lib/library, /tmp process foo2 read secrets from /run/secrets
DNS: Process foo1 query www.somedomain1.com, www.somedomain2.com
Network: Process foo2 listen on port 80

The forensics requester 140 may be, but is not limited to, a security information and events management (SIEM) system, a user device, and the like. The forensics requester 140 is configured to send requests for security forensics information to the master console 120. In response, the master console 120 provides access to the events data from the host devices 130 to the forensics requester 140. In some implementations, access may be limited based on, for example, a type of system of the forensics requester 140, a user of the forensics requester 140, required authentication procedures, and the like.

Figure 2:
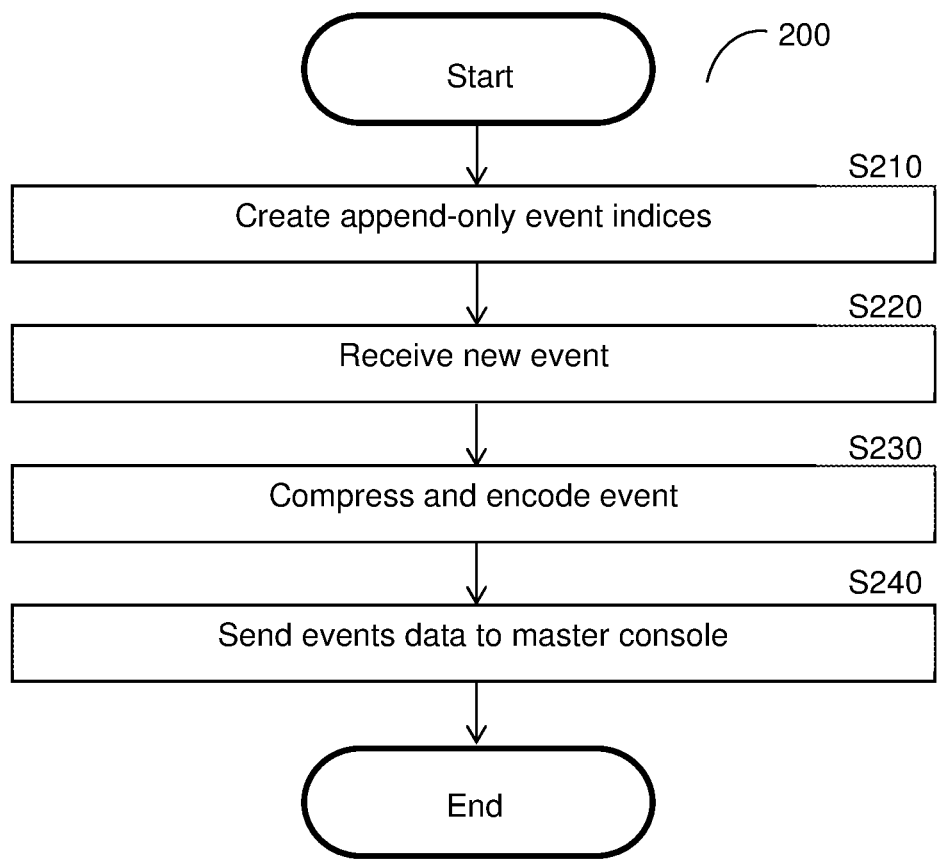
FIG. 2 is a flowchart illustrating a method for efficient distributed security forensics according to an embodiment.

FIG. 2 is an example flowchart 200 illustrating a method for distributed security forensics according to an embodiment. In an embodiment, the method may be performed by the host device 130, FIG. 1. In particular, the method may be performed by the agent 134.

At S210, an append-only event index is created for each virtualization entity to be monitored. The append-only index maintains a record of changes to the event index. The created event index is per entity rather than being a single index for all data. When the entity is a group of containers, an append-only event index may be created for each container. Each entity is associated with an entity profile defining details of common or otherwise known events for the entity. The event indices may be included in the entity profile.

In an optional embodiment, to allow for higher granularity even when events are received at a higher frequency, the append-only event index may store timestamp events instead of storing a time for each event individually. This may allow, for example, millisecond or second granularity. To this end, the index may be created such that it includes timestamp events between and among received events. As a non-limiting example, an event index featuring timestamp events may look as follows, with "t #" representing a timestamp event and "e #" representing a received event: <t1,e1,e2,e3,e4,t2,e5, . . . >. In this example, two timestamp events denote distinct times such that the last timestamp event before a received event in the event index approximately represents the time at which the received event was received. Thus, as an example, if "t1" is 1 millisecond from a starting time, events "e1", "e2", "e3", and "e4" occur approximately at 1 millisecond.

In another optional embodiment, to reduce space used by the index, the index can be circular, namely, the index may begin and end with a portion of the same event split into two partial events. As a non-limiting example, for an event index including <e1,e2,e3>, adding an event e4 may result in the index: <e4(partial),e1(corrupted),e2,e3,e4(partial)>. Any events lost (e.g., represented as corrupted) may be skipped since each entry has a delimiter prefix with the size of the entry. In a further embodiment, to provide lower granularity for the timestamps when one of the entities is split into partial events, the timestamp for the next entity may be based on the timestamp event before the righthand side partial event. With respect to the previous example, the righthand partial split event would be the instance of "e4 (partial)" appearing after "e3" when ordered from left to right.

In yet another optional embodiment, to avoid loss of data to due high frequency occurrence of the same event (e.g., when an event is a network connection that is made to the same IP address every 100 milliseconds), the index may only be written to every predetermined number X of events.

At S220, a new event is received. The received event is related to the entity. The event may be, but is not limited to, a networking event (e.g., an event indicating source, destination, port, time, etc.), a filesystem access event (e.g., an event indicating type, path, permissions, user and time, etc.), and the like.

At S230, the received event is compressed and encoded based on the entity profile of the entity. In an embodiment, S230 further includes adding a change to the events index based on the encoded event. The compression and encoding may be performed such that, when a process is a known process for the entity as defined in the entity profile, an event indicating the process occurred may be encoding using codes representing at least the process path, time, and other details of the process. Such codes may be variable-length codes each assigned to the process. The encoded events data may be subsequently unpacked based on the entity profile.

In an embodiment, each event appearing in the entity profile is encoded with information including <event type, index in the entity profile> such that 2 bytes are needed to store the data associated with the events. Encoding the events based on the entity profile allows for reducing the size of compressed data as compared to storing and compressing the entire information. The index in the entity profile may be an index with respect to an array stored in the entity profile that is associated with the type of event, e.g., a process event may be indexed in a process array. As a non-limiting example, an entity profile may define a process array including "foo1", "foo2", and "foo3." When "foo2" starts, the event may be encoded as <0, 2>, where "0" is the value assigned to represent process type events and "2" is the index of "foo2" in the process array. This allows for reducing the space required for storing a compressed version of the information that would otherwise be in a form such as, for example, <event type:process,event:foo2>.

As a non-limiting example of encoding, the encoding may be profile symbol encoding. Specifically, in this example, a profile defines the processes "/bin/curl" and "/bin/sleep" and indicates a scheme for representing the process "/bin/sleep" by replacing its binary invocation path with an index "2" and encoding the time for the process as the delta from profile creation (i.e., the time between profile creation and this instance of "/bin/sleep"). Storing the delta allows for storing time data with compact nanosecond granularity and for searching with respect to relative times of process instances.

At S240, the encoded and compressed events data is sent to a master console (e.g., to the master console 120 over the network 110, FIG. 1). Specifically, in an embodiment, the events index including all changes based on encoded events is uploaded. The events data, once uploaded to and unpacked by the master console, may be fetched upon request. The master console may store events data from multiple host devices to provide access to any host device's events data without requiring accessing the host device directly. Since each host device compresses and encodes events data before sending to the master console, the computing resources needed by the master console is reduced as compared to solutions where the master console receives and processes all events data.

It should be noted that FIG. 2 is described with respect to receiving and encoding a single event merely for simplicity purposes, and that multiple events may be received and encoded without departing from the disclosed embodiments. To this end, multiple changes may be added to the events index before uploading of the events index, the events index may be uploaded multiple times after changes have been added to the events index, or both.

Figure 3:
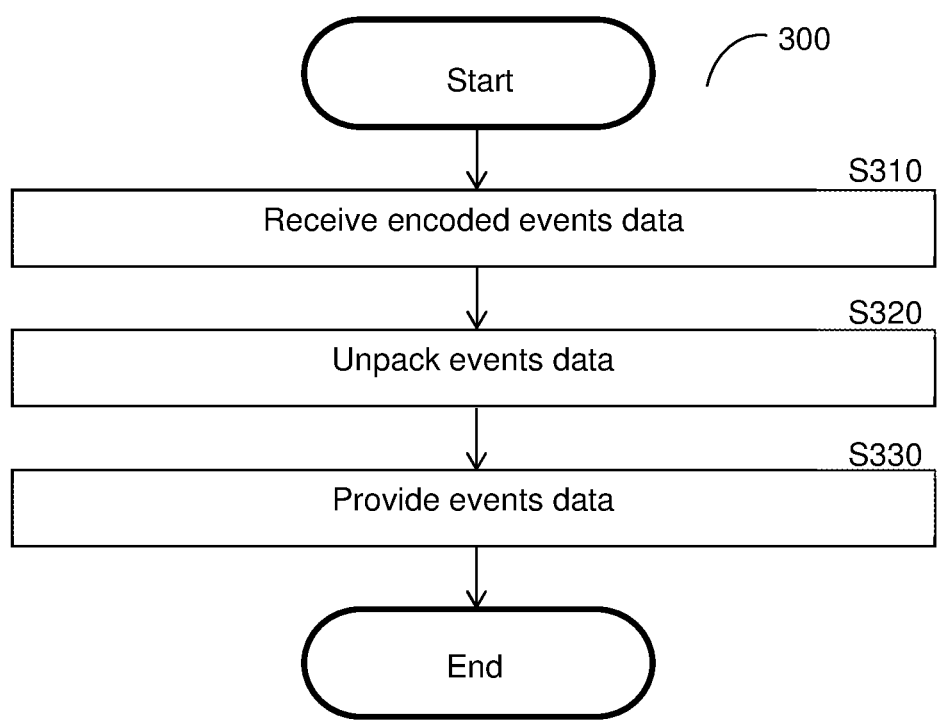
FIG. 3 is a flowchart illustrating a method for accessing events data.

FIG. 3 is an example flowchart 300 illustrating provided access to events data recorded in a distributed manner according to an embodiment. In an embodiment, the events data is encoded and uploaded to a master console as described herein above with respect to FIG. 2. To this end, the method of FIG. 3 may be performed by such a master console when the events data is received by the master console. In an example implementation, the events data is encoded and uploaded to the master console only when requested to minimize the number of transmissions of the events data when not needed.

At S310, encoded events data is received from one or more host devices. The events data may be received over time and may be processed, for example, as such data is received, at periodic time intervals, and the like. In an embodiment, the events data may be received with an indication of the coding process used to encode the data.

At S320, the encoded events data is unpacked based on the coding process used to encode the events data, for example as defined in an entity profile of the entity related to the event. The unpacking may include translating the codes in the encoded data into corresponding process or other event details defined in the entity profile.

At S330, the unpacked events data is provided, for example, to a system configured to utilize the events data for purposes such as cybersecurity (e.g., a SIEM system or distributed logging framework) or to a user device requesting the events data. For example, the unpacked events data may be provided to the forensics requester 140, FIG. 1.

Figure 4:
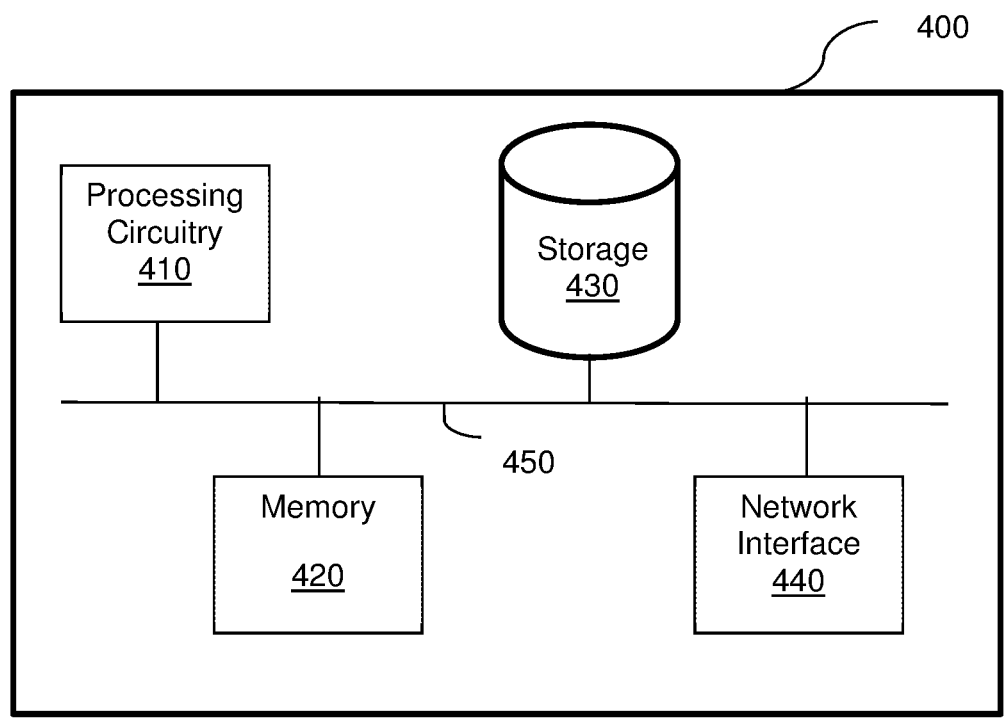
FIG. 4 is a schematic diagram of a distributed security forensics analyzer according to an embodiment.

FIG. 4 is an example schematic diagram of a host device 400 configured for distributed security forensics according to an embodiment. The host device 400 includes a processing circuitry 410 coupled to a memory 420, a storage 430, and a network interface 440. In another embodiment, the components of the host device 400 may be communicatively connected via a bus 450. As described above, an agent (e.g., one of the agents 134 of FIG. 1) may be executed by the host device 400 (i.e., the host device 400 may be one of the host entities 130, FIG. 1).

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 420 may be volatile (e.g., RAM, etc.), non-volatile (e.g., ROM, flash memory, etc.), or a combination thereof. In one configuration, computer readable instructions to implement one or more embodiments disclosed herein may be stored in the storage 430.

In another embodiment, the memory 420 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 410 to perform the various processes described herein. Specifically, the instructions, when executed, cause the processing circuitry 410 to provide distributed security forensics as discussed hereinabove. Specifically, the host device 400 includes an agent configured to monitor execution of one or more entities such as software containers or light VMs as described herein.

The storage 430 may be magnetic storage, optical storage, and the like, and may be realized, for example, as flash memory or other memory technology, CD-ROM, Digital Versatile Disks (DVDs), or any other medium which can be used to store the desired information.

The network interface 440 allows the host device 400 to communicate for the purpose of, for example, uploading encoded events data to a master console.

It should be understood that the embodiments described herein are not limited to the specific architecture illustrated in FIG. 2, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for efficient distributed security forensics using process path codes, comprising:

creating, at a first host device configured to run a first virtualization entity, a first event index for the first virtualization entity;

encoding at least one event related to the first virtualization entity, wherein each event includes a process having a process path, wherein encoding the at least one event includes replacing at least a portion of each event with at least one code representing at least the process path of the respective process;

updating the first event index based on the encoded at least one event; and sending the first event index to a master console, wherein the master console is configured to receive a plurality of event indices created by a plurality of host devices with respect to a plurality of virtualization entities.

2. The method of claim 1, wherein the first event index is optimized with respect to write time, wherein the first event index is not optimized with respect to read time.

3. The method of claim 1, wherein the at least one event is encoded based on an event profile of the first virtualization entity, wherein the encoded at least one event is decoded by the master console based on the event profile of the first virtualization entity.

4. The method of claim 3, wherein the event profile of the first virtualization entity defines the encoding process used for encoding the event.

5. The method of claim 3, wherein the event profile of the first virtualization entity further includes the first event index.

6. The method of claim 1, wherein the first virtualization entity is any of: a software container, a plurality of software containers, and a lightweight virtual machine.

7. The method of claim 1, further comprising:
compressing the at least one event.

8. The method of claim 1, wherein the at least one event includes at least one of: at least one networking event, and at least one filesystem access event.

9. The method of claim 1, wherein the first virtualization entity is any of: at least one container, a virtual machine, an image, a host operating system service, a user, a file, and a network interface.

10. A non-transitory computer-readable medium having stored thereon instructions for causing a processing circuitry to execute a process, the process comprising:

creating, at a first host device configured to run a first virtualization entity, a first event index for the first virtualization entity;

encoding at least one event related to the first virtualization entity, wherein each event includes a process having a process path, wherein encoding the at least one event includes replacing at least a portion of each event with at least one code representing at least the process path of the respective process;

updating the first event index based on the encoded at least one event; and sending the first event index to a master console, wherein the master console is configured to receive a plurality of event indices from a plurality of host devices configured to run a plurality of virtualization entities.

11. A host device for efficient distributed security forensics using process path codes, wherein the host device is configured to run a first virtualization entity, comprising:

a processing circuitry; and
a memory, the memory containing instructions that, when executed by the processing circuitry, configure the system to:

create a first event index for the first virtualization entity;

encode at least one event related to the first virtualization entity, wherein each event includes a process having a process path, wherein encoding the at least one event includes replacing at least a portion of each event with at least one code representing at least the process path of the respective process;

update the first event index based on the encoded at least one event; and send the first event index to a master console, wherein the master console is configured to receive a plurality of event indices created by a plurality of other host devices with respect to a plurality of virtualization entities.

12. The host device of claim 11, wherein the first event index is optimized with respect to write time, wherein the first event index is not optimized with respect to read time.

13. The host device of claim 11, wherein the at least one event is encoded based on an event profile of the first virtualization entity, wherein the encoded at least one event is decoded by the master console based on the event profile of the first virtualization entity.

14. The host device of claim 13, wherein the event profile of the first virtualization entity defines the encoding process used for encoding the event.

15. The host device of claim 13, wherein the event profile of the first virtualization entity further includes the first event index.

16. The host device of claim 11, wherein the first virtualization entity is any of: a software container, a plurality of software containers, and a lightweight virtual machine.

17. The host device of claim 11, wherein the host device is further configured to:
compress the at least one event.

18. The host device of claim 11, wherein the at least one event includes at least one of: at least one networking event, and at least one filesystem access event.

19. The host device of claim 11, wherein the first virtualization entity is any of: at least one container, a virtual machine, an image, a host operating system service, a user, a file, and a network interface.

20. A method for efficient write time distributed security forensics, comprising:

creating, at a first host device configured to run a first virtualization entity, a first event index for the first virtualization entity, wherein the first event index is optimized with respect to write time, wherein the first event index is not optimized with respect to read time;

encoding at least one event related to the first virtualization entity, wherein each event includes a process having a process path;

updating the first event index based on the encoded at least one event; and sending the first event index to a master console, wherein the master console is configured to receive a plurality of event indices created by a plurality of host devices with respect to a plurality of virtualization entities.

* * * * *